(12) United States Patent
Jones

(10) Patent No.: US 7,513,856 B2
(45) Date of Patent: Apr. 7, 2009

(54) WEIGHT PLATE RETENTION COLLAR

(76) Inventor: Dylan Jones, P.O. Box 2160, Santa Barbara, CA (US) 93120

( * ) Notice: Subject to any disclaimer, the term of this patent is extended or adjusted under 35 U.S.C. 154(b) by 105 days.

(21) Appl. No.: 11/803,582

(22) Filed: May 14, 2007

(65) Prior Publication Data

US 2008/0287271 A1    Nov. 20, 2008

(51) Int. Cl.
*A63B 21/072* (2006.01)
(52) U.S. Cl. .................. 482/107; 482/98; 482/108
(58) Field of Classification Search .......... 24/19, 24/270, 271, 273; 482/104–107
See application file for complete search history.

(56) References Cited

U.S. PATENT DOCUMENTS

| | | | | |
|---|---|---|---|---|
| 2,298,710 A | * | 10/1942 | Mackay et al. | 24/270 |
| 4,639,979 A | * | 2/1987 | Polson | 482/107 |
| 6,405,411 B1 | * | 6/2002 | Allemann et al. | 24/19 |

* cited by examiner

*Primary Examiner*—Jerome Donnelly
(74) *Attorney, Agent, or Firm*—Sandy Lipkin

(57) ABSTRACT

A retention collar for securing weights to a barbell that includes two side plates with a pull bar and a cam lever. Two sets of pressure pins provide a frictional fit with the barbell when the collar is in its closed position, which is achieved by use of the am lever. The side plates are secured to each other by screws or rivets.

8 Claims, 6 Drawing Sheets

WEIGHT PLATE RETENTION COLLAR

BACKGROUND OF THE INVENTION

1. Field of the Invention

The present invention relates generally to the field of weight training devices and more particularly to barbells and dumbbells that use removable weight plates.

2. Description of the Prior Art

Free weights are used for recreational purposes in schools, rehabilitation purposes in physical therapy settings and by the general public as a tool to improve and maintain physical fitness through improved strength and increased muscle mass.

Weight lifting for improvement and maintenance of physical fitness has led to a boon not only physical fitness facilities, but also in the use of home exercise equipment. Most weight lifting regimens involve the use of free weights. Free weights consist of barbells or dumbbells and weight plates. Barbells in particular must be used in conjunction with weight plates to achieve a desired weight amount. To achieve the utility of these components, a user must use both the bar of the barbell and the weight plates, along with a means for securing the weight plates to the bar.

Weight plates traditionally consist of a disc shaped mass with a cylindrical hole placed through the center of the plate to retain the plate to the bar. Barbells have a cylindrical handle, longer than a dumbbell. Weight masses are attached at both ends of the bar, or the bar can accept weight plates at both ends to reach a desired overall mass. The weight plates are mounted on the barbell sleeve, which is a component that is permanently attached the barbell. The barbell sleeve consists of a sleeve collar and a sleeve body.

When using a barbell (or adjustable dumbbell) the free weights need to be securely fastened to the bar and easy to use. Unexpected movement of the weight plates need to be prevented for safety. Furthermore, the weight plates need to be secured in a manner that does not damage the barbell, the weight plates, or the dumbbell.

Prior art in the field seeks to achieve these ends, but heretofore has been somewhat hit or miss with regard to success. Existing products use springs, spring-loaded cams, or screws to secure themselves to the bar. Current inventions that use screws or threaded rods can damage the barbell sleeve. Prior art products are heavy and add a significant amount of weight to the barbell assembly. Current products lack durability and are often made of many small parts that can be lost or broken. Many current products use two or more inches of sleeve length in order to fasten securely, making the entire apparatus bulky. Furthermore, current inventions do not accommodate all sizes of barbell sleeves equally due to the limited range of their clamping force.

Some prior art has included locking pins (U.S. Pat. No. 4,955,603 to Becker); plunger type pieces (U.S. Pat. No. 5,346,449 to Schlagel; U.S. Pat. No. 5,911,651 to Liu; and U.S. Pat. No. 6,059,700 to Ellenburg); o-rings (U.S. Pat. No. 5,449,333 to Carter); bolts and screws (U.S. Pat. No. 6,602,169 to Patti; a rotating handle with a washer and tie-rod (U.S. Pat. No. 6,887,189 to Schiff); a ratcheting apparatus (U.S. Pat. No. 6,971,974 to Bowman et al.); an internal cam mechanism (U.S. Pat. No. 7,025,713 to Dalebout et al.); and interlocking components (U.S. Pat. No. 7,048,678).

Other prior art has used friction points similar to the present invention, but with different, more complex structures. See U.S. Pat. No. 4,893,810 to Lee; U.S. Pat. No. 5,591,109 to Strnad; U.S. Pat. No. 5,605,411 to Wilson et al; and U.S. Pat. No. 6,007,268 to Whittington et al.

SUMMARY OF THE INVENTION

The current invention includes a plurality of components that, when intended, apply external pressure to the surface of a barbell sleeve. The pressure retains the invention due to the friction between the device and the barbell sleeve. The friction is created between the malleable cylindrical pins and the barbell sleeve.

The invention preferably consists of two semi-circular components, hinged at one end. The other ends would be attached to one another through one or more components that provide the function of activating a pivot, thereby applying pressure to the weight sleeve.

The device has two functional states. First, is the open position and second is the closed position. In the open position, the invention slides over the barbell sleeve easily in order to place in thereon. In the closed position, the device is clamped firmly to the barbell sleeve, thus restricting its movement. Weight plates will be securely retained between the sleeve collar and the device, reducing the tendency of the free weights of sliding free from the barbell sleeve.

The preferred embodiment of invention defines a weight retention collar for securing weight plates to a barbell comprising an outer frame that is shaped to form an interior space sufficient to allow the placement of a barbell therein, the frame having a first side and second side; a plurality of pressure pins, each of the pressure pins having a first side and second side, the first side of each of the pressure pins being attached to the interior of the first side of the outer frame and the second side of each of the pressure pins being attached to the interior of the second side of the outer frame; a pull bar connected to one of the plurality of pressure pins; and a lever attached to the pull bar; wherein when the lever is activated to pull on the pull bar, the pressure pins close the outer frame around the barbell.

The embodiment above can be further modified by defining that the collar is used to secure weight plates to a dumbbell.

The embodiment above can be further modified by defining that the interior space of the outer frame is substantially cylindrical in shape.

The embodiment above can be further modified by defining that the pressure pins are substantially cylindrical in shape.

The embodiment above can be further modified by defining that the lever is a cam lever.

An alternative embodiment of the instant invention is a method for securing weights to a barbell comprising placement of one or more weights on the sleeve of a barbell; placement of a weight retention collar in its open position around the sleeve of the barbell behind the weight plates, the weight retention collar further comprising an outer frame that is shaped to form an interior space sufficient to allow the placement of the barbell therein, the frame having a first side and second side; a plurality of pressure pins, each of the pressure pins having a first side and second side, the first side of each of the pressure pins being attached to the interior of the first side of the outer frame and the second side of each of the pressure pins being attached to the interior of the second side of the outer frame; a pull bar connected to one of the plurality of pressure pins; a lever attached to the pull bar; moving the weight retention collar to its closed position through the activation of the lever, the activation allowing the lever to pull on the pull bar, the pressure pins closing the outer frame around the barbell.

The embodiment above can be further modified by defining that the collar is used to secure weight plates to a dumbbell.

The embodiment above can be further modified by defining that the interior space of the outer frame is substantially cylindrical in shape.

The embodiment above can be further modified by defining that the pressure pins are substantially cylindrical in shape.

The embodiment above can be further modified by defining that the lever is a cam lever.

BRIEF DESCRIPTION OF THE DRAWINGS

This invention can better be understood by reference to the drawings, provided for exemplary purposes, and in which.

DETAILED DESCRIPTION OF THE PREFERRED EMBODIMENT

The preferred embodiment of the invention is illustrated in the attached figures. The cam lever is hinged to the side plates. The pull bar is also hinged to the cam lever and the other pair of side plates. Both pairs of side plates should all be hinged together at their opposing ends. This combination of hinges creates the mechanical assembly of the device.

The pressure pins attached to the side plates by cylindrical pins that pass through their centers. By this means of attachment, there is no way that these cylindrical pressure pins can be disconnected from their mountings. Finally, the side plates are attached to one another with four metal screws or rivets which keep the assembly from becoming loose.

This invention will reduce the tendency for the weight plates to slide free from the barbell sleeve. It adds less weight to the barbell than prior art devices. It uses less space on the barbell sleeve. It is significantly more durable than similar devices. It is simpler and more ergonomic to use than existing inventions, and it accommodates a wide range of barbell sleeves.

The invention is operated by first opening the cam lever until the invention is in the fully open position. Then the cam lever bottoms out on the pull bar, creating a natural stop. The device is then slid onto the barbell sleeve until it makes contact with the weight plate. The user then applies pressure to the device to firmly secure the weight plates against the barbell collar. The cam lever is then closed, resulting in the device locking itself securely onto the bar. The weight plates will now be held tightly against the barbell collar.

Figure 9:
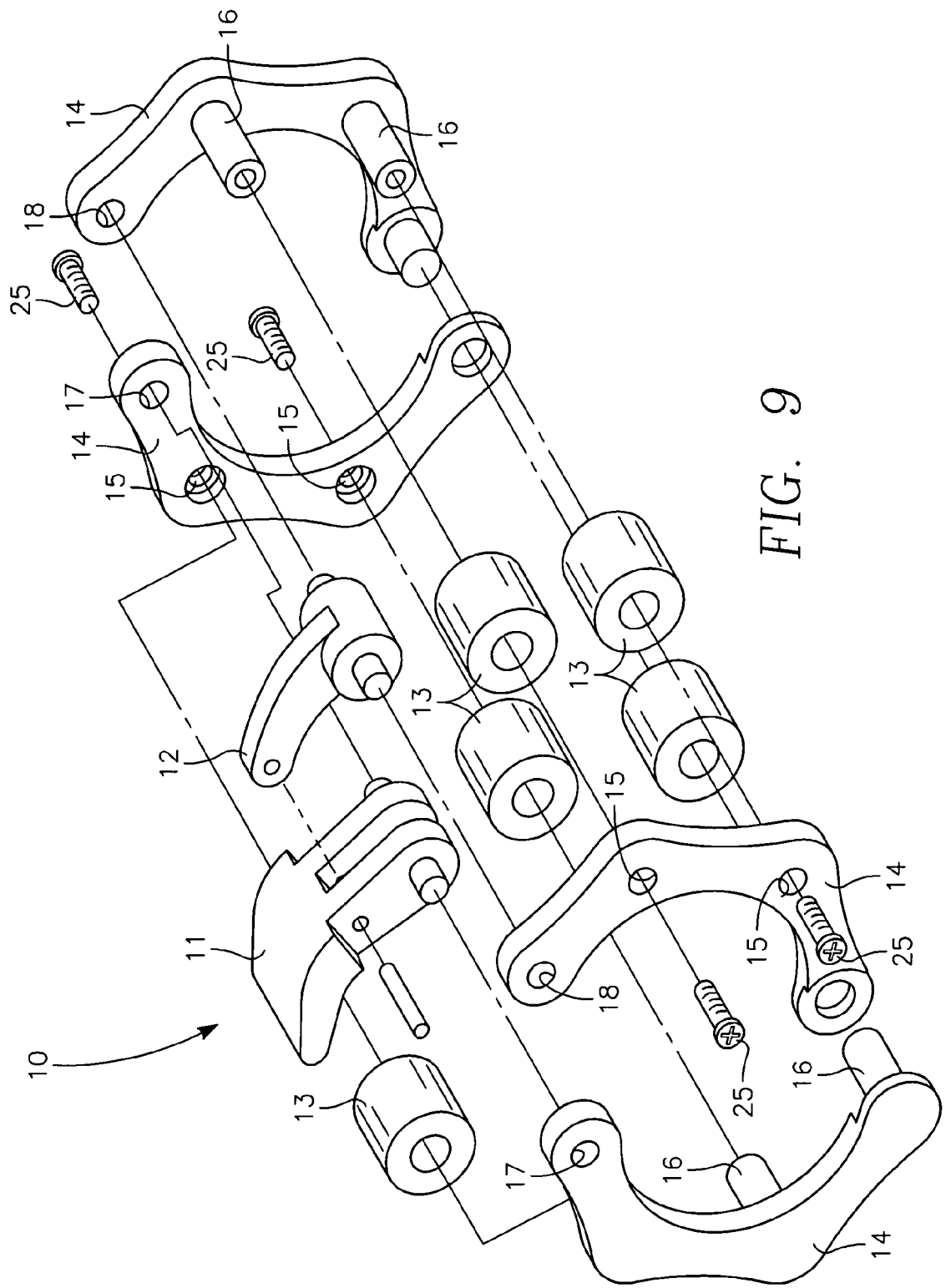
FIG. 9 is an exploded view of the invention.

The invention itself is a weight plate retention collar 10 whose component parts can be seen in detail in FIGS. 1, 6, 8 and 9. The component parts include the cam lever 11, which attaches to the pull bar 12; a series of pressure pins 13; an outside plate 14 composed of for pieces that connect together and that can be seen in detail in FIG. 9; and a series of holes 15 and pins 16 that hold the pressure pins 13 in place inside the outside plate 14. In FIG. 9 another hole 17 connects the cam lever 11 to the outside plate 14. Yet another hole 18 connects the pull bar 12 to the cam lever 11. Shown as a means for attaching the pins 16 to the holes 15, the attaching means are screws 25, but rivets, glue or any other means that will secure the pins 16 to the holes 15 can also be used.

Figures 5A, 5B, 5C:
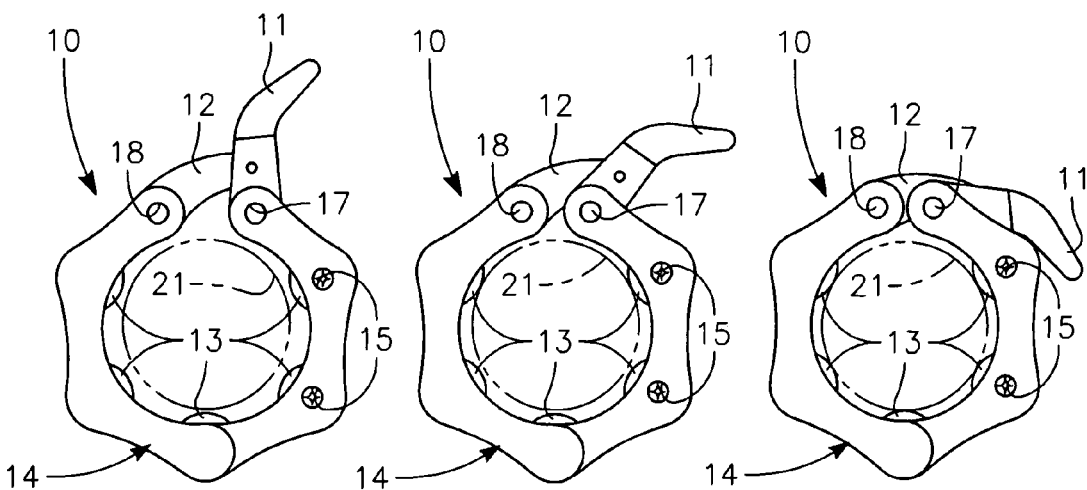
FIG. 5A is a view of the invention in the open position of attachment to the barbell sleeve.
FIG. 5B is a view of the invention in the intermediate position of attachment to the barbell sleeve.
FIG. 5C is a view of the invention in the closed position of attachment to the barbell sleeve.
Figure 6:
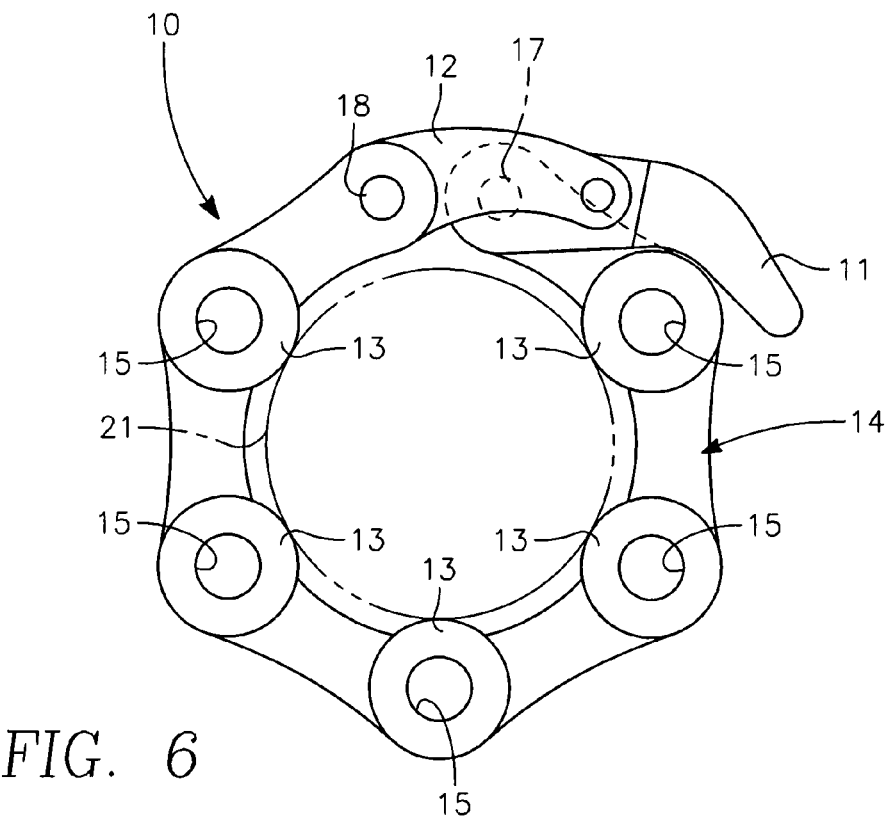
FIG. 6 is a cross-section view of the invention illustrating the cylindrical pressure pins.

The weight plate retention collar 10 attaches to a barbell 19. The barbell 19 includes the barbell bar 20, the sleeve body 21 and the sleeve collar 22. The sleeve collar 22 is in place to provide a set point for the weight plates 23 to abut against to increase the work load for the weight lifter. Once the weight plates 23 are placed on the sleeve body 21 and pressed against the sleeve collar 22, the weight plate retention collar 10 is then placed around the sleeve body 21 while in the open position as illustrated in FIG. 5A.

Figure 1:
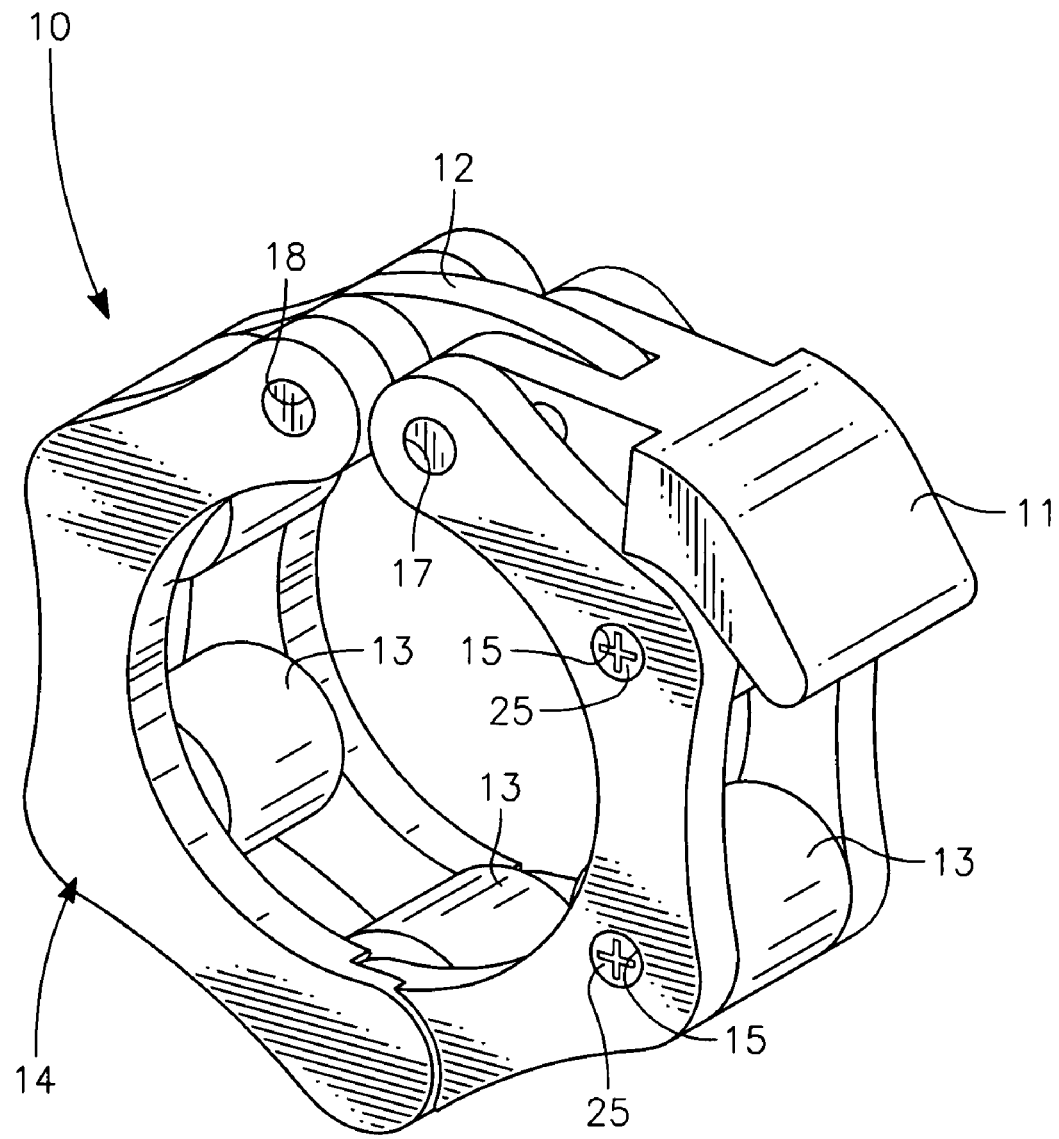
FIG. 1 is a perspective view of the invention.
Figure 2:
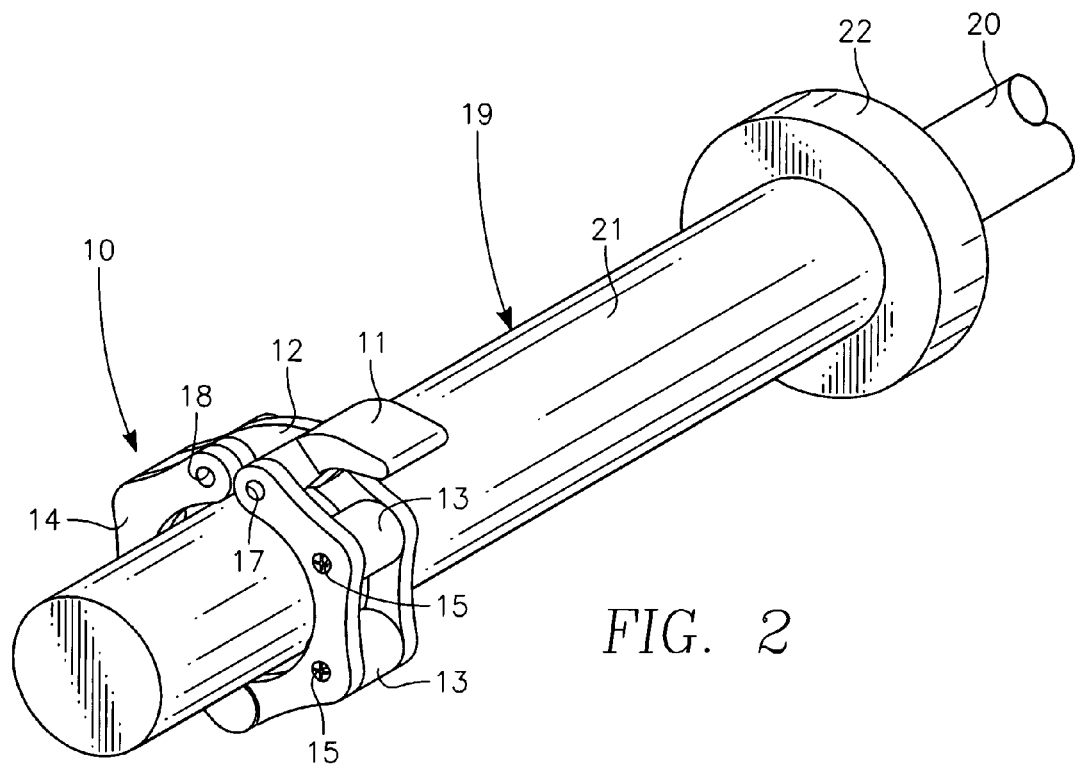
FIG. 2 is a perspective view of the invention as it attaches to a barbell sleeve.
Figure 3:
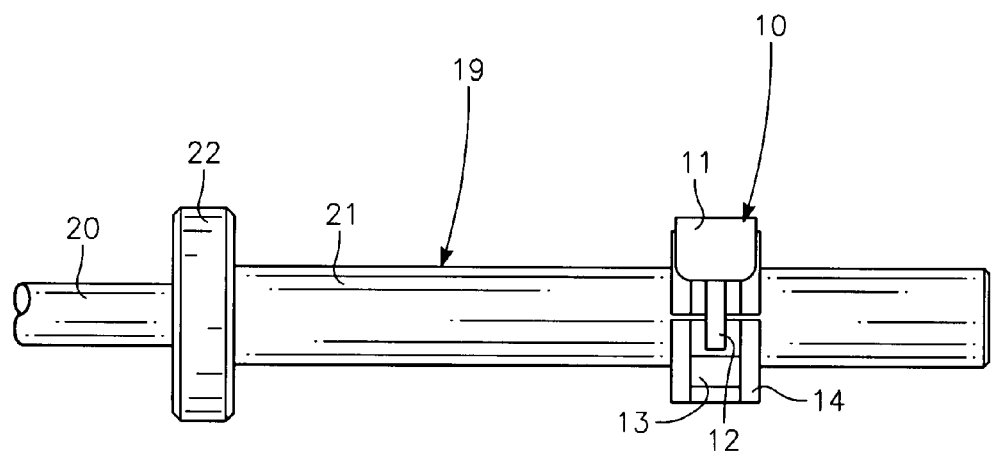
FIG. 3 is a top view of the invention as it attaches to a barbell sleeve.
Figure 4:
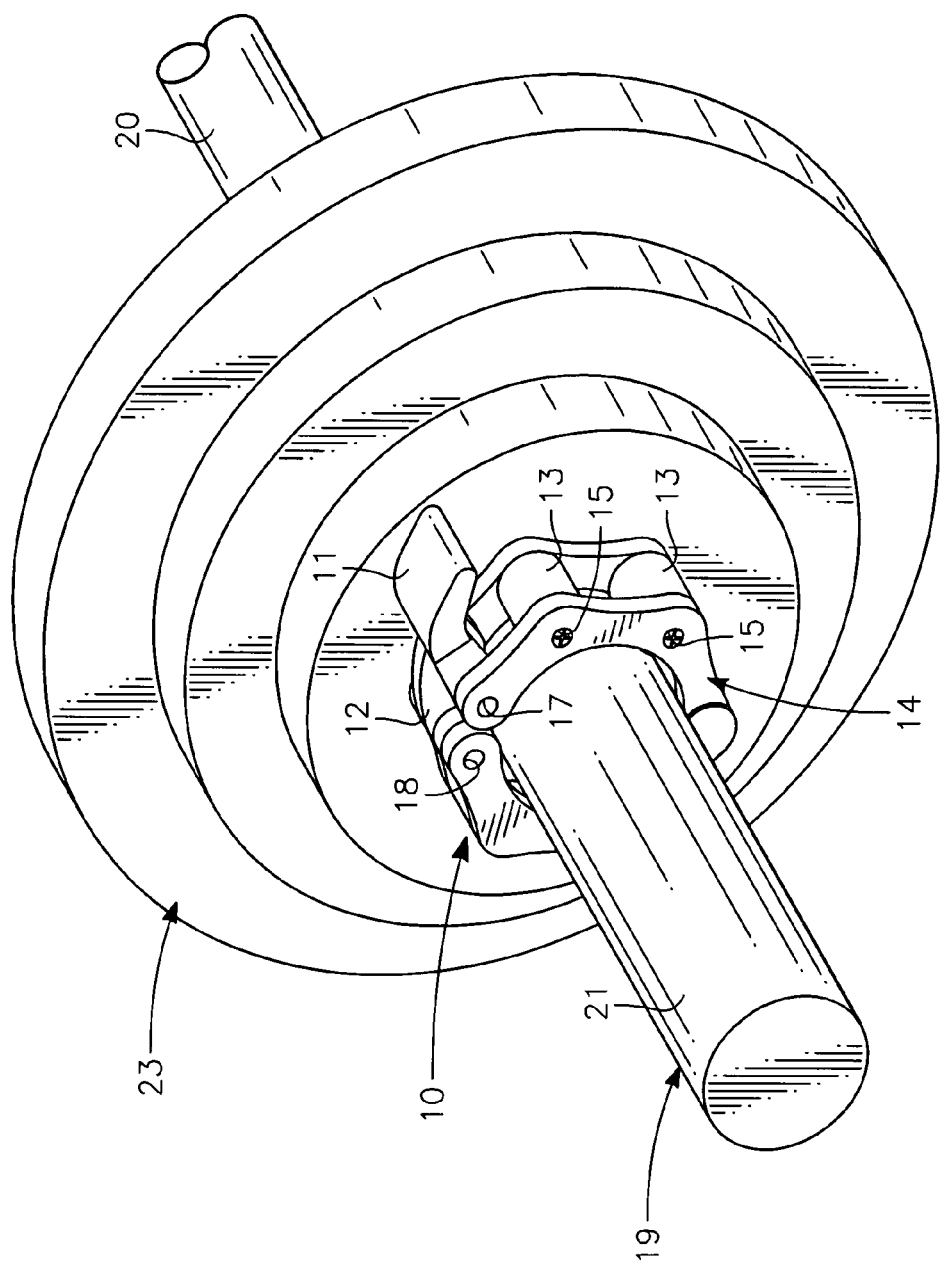
FIG. 4 is a perspective view of the invention as it is used on a barbell sleeve to secure weight plates.
Figure 7:
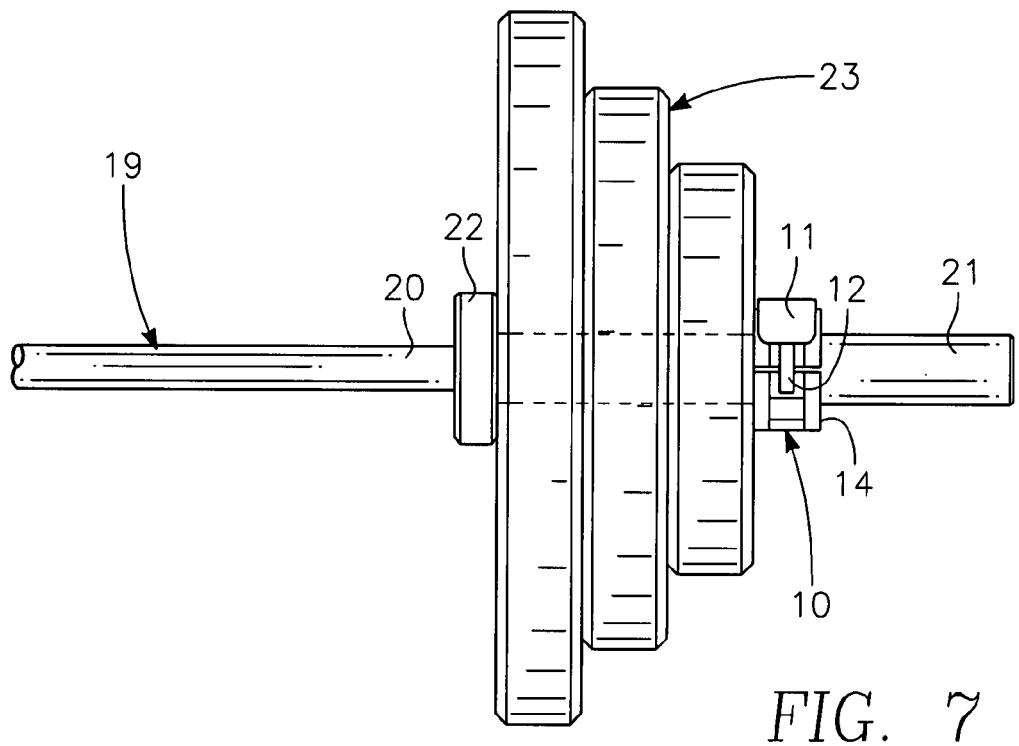
FIG. 7 is a side view of the invention as it is used on a barbell sleeve to secure weight plates.
Figure 8:
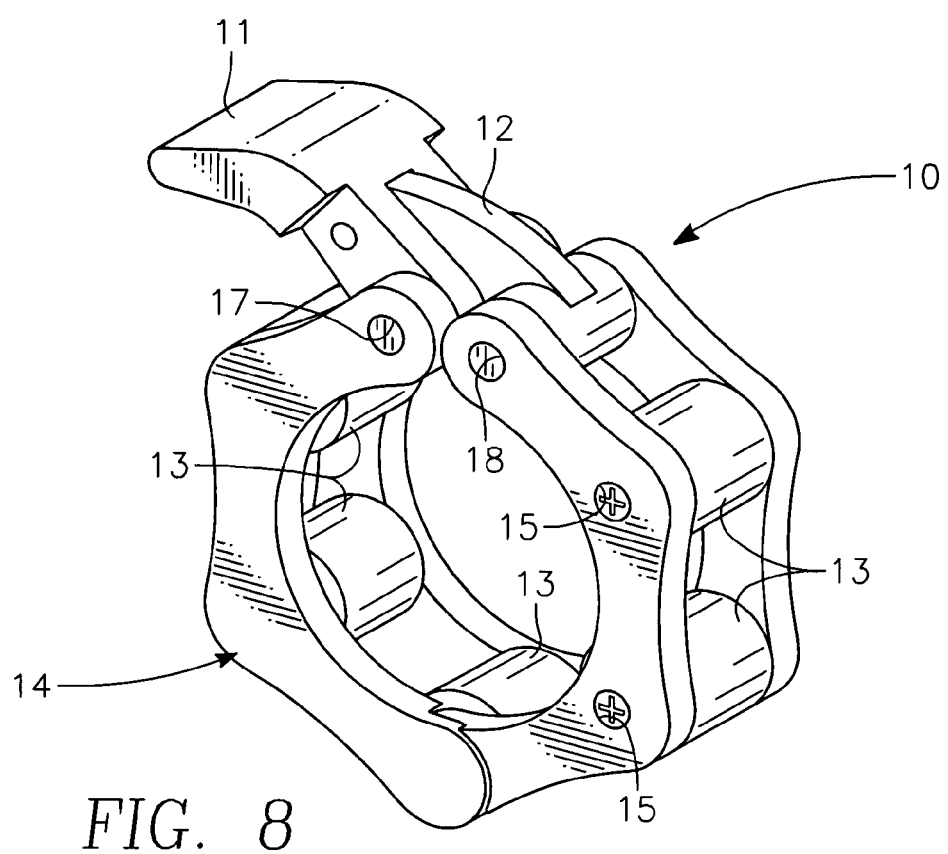
FIG. 8 is perspective view of the invention from the opposite direction from FIG. 1.

Once on the sleeve body 21, the weight plate retention collar 10 is then placed against the weight plates 23 forming a snug fit against the sleeve collar 22, as illustrated in FIGS. 4 and 7. The cam lever 11 is then moved through the intermediate position as illustrated in FIG. 5B and into the closed position as illustrated in FIG. 5C. The cam lever 11 pulls on the pull bar 12 and brings the pressure pins 13 together and tightens the outside plate 14 against the barbell sleeve 21, holding the weight plates 23 snugly in place for use.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated. Those skilled in the art will make modifications to the invention for particular applications of the invention.

What is claimed is:

1. A weight retention collar for securing weight plates to a barbell comprising an outer frame that is shaped to form an interior space sufficient to allow the placement of said barbell therein, said frame having a first side and second side;

a plurality of pressure pins that are substantially cylindrical in shape, each of said pressure pins having a first side and second side, said first side of each of said pressure pins being attached to the interior of said first side of said outer frame and said second side of each of said pressure pins being attached to the interior of said second side of said outer frame;

a pull bar connected to one of said plurality of pressure pins; and a lever attached to said pull bar;

wherein when said lever is activated to pull on said pull bar, said pressure pins close said outer frame around said barbell.

2. A weight retention collar as defined in claim 1 wherein said interior space of said outer frame is substantially cylindrical in shape.

3. A weight retention collar as defined in claim 1 wherein said lever is a cam lever.

4. A method for securing weights to a barbell comprising placement of one or more weights on the sleeve of said barbell;

placement of a weight retention collar in its open position around said sleeve of said barbell behind said weight plates, said weight retention collar further comprising an outer frame that is shaped to form an interior space sufficient to allow the placement of said barbell therein, said frame having a first side and second side;

a plurality of pressure pins, each of said pressure pins having a first side and second side, said first side of each of said pressure pins being attached to the interior of said first side of said outer frame and said second side of each of said pressure pins being attached to the interior of said second side of said outer frame;

a pull bar connected to one of said plurality of pressure pins; and a lever attached to said pull bar;

moving said weight retention collar to its closed position through the activation of said lever said activation allowing said lever to pull on said pull bar, said pressure pins closing said outer frame around said barbell.

5. A method as defined in claim 4 wherein said collar is used to secure weight plates to a dumbbell.

6. A method as defined in claim 4 wherein said interior space of said outer frame is substantially cylindrical in shape.

7. A method as defined in claim 4 wherein said pressure pins are substantially cylindrical in shape.

8. A method as defined in claim 4 wherein said lever is a cam lever.

* * * * *